March 31, 1953 W. H. KREIDL 2,632,921
METHOD FOR IMPROVING THE BONDING PROPERTIES
OF POLYETHYLENE PLASTICS
Filed Jan. 18, 1949
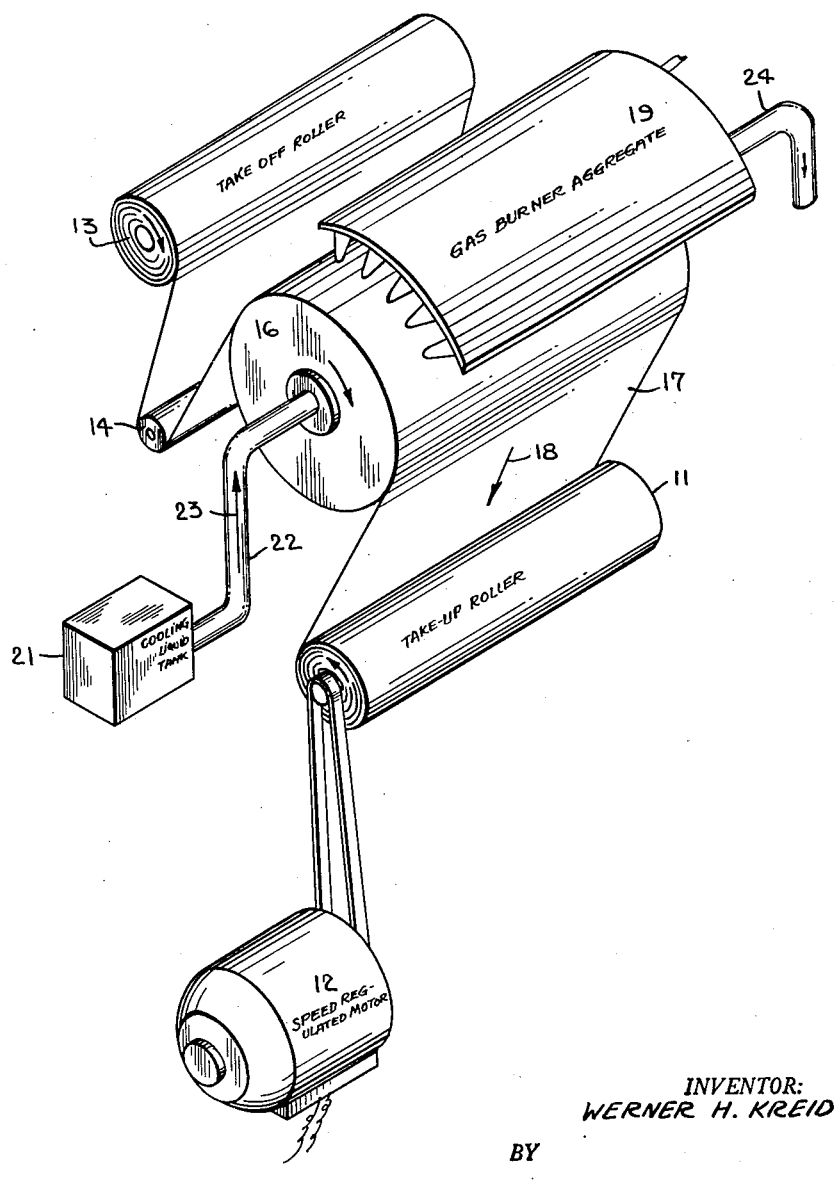
INVENTOR:
WERNER H. KREIDL,
BY
HIS AGENT.

Patented Mar. 31, 1953

2,632,921

UNITED STATES PATENT OFFICE 2,632,921

METHOD FOR IMPROVING THE BONDING PROPERTIES OF POLYETHYLENE PLASTICS

Werner H. Kreidl, New York, N. Y.

Application January 18, 1949, Serial No. 71,557

13 Claims. (Cl. 18—47.5)

1

This invention relates to an improved method for improving the bonding properties of polyethylene type plastics, and more particularly for the printing of plastics of the polyethylene type.

The printing of plastics of all kinds has provided many difficulties due to the inertness of the surface and for other reasons. In most cases, however, fairly satisfactory printing inks could be developed. However, in the particular case of plastics of the polyethylene type the very best printing inks thus far developed are suitable only for very thin sheets, such as not in excess of a few mils. To promote better adhesion of these inks on such thin sheets, it is customary to bake the printed article at about 100-250° F.

Object of this invention is an improved method for improving the bonding properties of such resins. Another object is an improved method for bonding printing inks to such polyethylene type resins. In particular, the object of this invention is to improve the bonding properties of sheets or other articles made from polyethylene type resins which are thicker than about 10 mils. Other objects of this invention will become apparent in the following specification.

The present invention is based on the discovery that the surface structure of polyethylene type resins, chemically or physically, appears to be dependent on its thermal history. While the theory is not completely understood, the conditions for improving the surface for printing purposes were established by extensive experimental work. Accordingly, the following explanation of the underlying phenomena will serve to illustrate this invention and to facilitate its understanding without, however, being limited to the tentative theoretical explanations. It appears that the decreased cooling rate, as well as the peculiar temperature gradients set up through the cross section of relatively thick layers of polyethylene type materials when cooled down from the molding stage imparts a particularly inert surface structure to them. Inversely, when a relatively thin layer of such a material cools down from the molding stage it will rapidly cool throughout its entire thickness. By way of illustration, we might compare this with glass which is slowly cooled after its molding process as compared to one which has been rapidly quenched.

This invention is now based on the discovery that it is this difference in the thermal history which will cause the same material to show satisfactory adhesive properties with regard to the printing ink in thin layers, while it will fail with thick ones. Based on the principles of this invention it was, therefore, possible to develop control means to provide satisfactory and improved adhesion of printing inks and polyethylene type resins, independent of the thickness of the material to be printed or decorated. Of course, once the principles of this invention are well understood and general rules for improving adhesion are established, it will be readily apparent to those skilled in the art how to select the optimum treatment for any desired thickness of a polyethylene type resin and/or any specific commercial polyethylene type product.

The single view in the drawing is a perspective illustration of an apparatus for carrying out the method in accordance with the invention.

Generally speaking, best results will be obtained when the surface is heated to as high a temperature as possible which, however, is still compatible with the type of resin used and which will not destroy it physically or chemically, while the underlying body is heated up as little as possible. The most simple way of obtaining this aim is to take advantage of the relatively low heat conductivity of polyethylene type resins and to subject the surface to a hot blast of air for a relatively short period of time. Of course, any equivalent method for obtaining the same thermal conditions will be equally applicable and as long as heat can be restricted to the surface it will be immaterial whether heat is obtained by convection or by radiation, whether it be infra-red or even longer wave lengths of the electromagnetic spectrum.

In this respect, probably due to the greater mobility of the molecules, the polyethylene type resins show a behaviour which is different from the previously stated examples of glass but which might be in analogy with glass in or near the annealing range. While the bonding characteristics of polyethylene type resins can be markedly improved by the heat treatment according to this invention, and while this beneficial treatment can be carried out before or after the actual printing, the beneficial effect will be definitely dependent on the time lapsed between the treatment and printing, if printing is effected after the heat treatment. It appears that under the influence of the underlying layers the quenched surface will slowly reorient itself and lose its activated state, or in other words, its bonding capacity.

From these considerations it becomes apparent that the surface heating according to this invention and the customary baking of the entire product are two entirely different processes which create entirely different changes with respect to the physical and chemical structure of the surface of the material and, as a corollary thereof, entirely different results with respect to the bonding of the printing inks. As a matter of fact, in the case of polyethylene articles, thicker than 10 mils, no substantial improvement whatsoever will be obtained by the old baking process. This, however, does not mean that the process of the present invention is not suitable for quite thin layers of polyethylene, as long as the thickness in combination with the heating method used permits the establishment of a temperature differential which will favor the phenomena underlying this invention.

With reference to resins of the polyethylene type it will be understood that this is to comprise all the various resins obtained by the polymerization of ethylene or its homologues, or such copolymers thereof whose surface characteristics are predominantly or at least noticeably determined by the polyethylene constituents thereof, as will be readily understood by those skilled in the art.

While this invention, of course, is not restricted to any specific printing inks or other substances to be bonded to the polyethylene type resins, since it is entirely based on the change in the physical and/or chemical properties of the surface of polyethylene type resins, it will be obvious to those skilled in the art to select printing inks whose vehicle will be compatible with polyethylene type resins, or other materials to be bonded thereto, as can be judged by their relative adhesion to thin sheets of polyethylene. It may be mentioned, that at present the best printing inks for polyethylene are made with plasticized vinyl or vinyl derivatives or their homologues.

With respect to the surface temperatures necessary for activation, it is, of course, impossible to give definite limits. For any specific case those skilled in the art will be able to determine, by simple experiment, the best conditions once they have become familiar with the principles of this invention. By way of illustration, however, and as a guide for such experimentation, it can be stated that for the polyethylene materials now commercially available (having usually a molecular weight of over 20,000, and being free from any incorporated plasticizers), the surface temperature should be above 60–70° C., up to above the melting point, while the body of the article to be printed should be less than 60–70° C., preferably below 50° C.

The surface is thus first subjected to a heating operation for softening or melting the same.

While again no definite limit can be given for the thickness of the surface layer to be heated, it can be stated that this should not be in excess of about 5–10 mils. This thickness can be readily evaluated by determining the maximum thickness of the specific material up to which satisfactory adhesion can be obtained without making it absolutely necessary to take recourse to the method of the present invention. The thickness thus evaluated corresponds to a critical property of the material which in the following and in the claims will be referred to as the "inherent bonding thickness." While the exact physical or physico-chemical nature of this thickness is not readily understood, it appears that in materials thicker than this critical value the orientation and/or mobility of the molecules in the surface will be determined or predominantly influenced by the character of the underlying layers. This peculiar effect is evidenced by the interesting discovery described above where it was stated that a polyethylene type resin treated according to this invention will retain its improved bonding properties for a limited time even after the entire material has cooled down to room temperatures. Obviously the deactivation of the surface due to the forces, such as reorienting forces, exerted by the interior are slow due to the high viscosity of the material at ambient temperatures.

It is, however, preferable to confine such heating to a much thinner layer, which should not be in excess of ½ mil, and which layer should be heated over 120–130° C., preferably above the melting point of polyethylene, but below temperatures at which decomposition starts. The thickness of this optimum layer can be readily regulated by determining the maximum thickness of the specific material up to which optimum adhesion can be obtained and where the use of the method of the present invention does not cause any noticeable improvement in the bonding. The thickness thus evaluated corresponds to a critical property of the material, which in the following and in the claims will be referred to as the "optimal inherent bonding thickness."

The process according to the present invention may be illustrated by the following examples, without, however, being limited thereto:

(1) A .030″ polyethylene sheet is transported at a speed of 70 yards per minute past a gas flame at such a distance that the surface receives a sheen, that the temperature and heat on the surface is high enough to melt compounds placed on the surface having a melting point higher than 70° C. but not as high as to melt compounds of a melting point higher than 100° C., while the reverse side to the flame does not heat up to more than 50° C. The actual temperature on the surface exposed to the flame is near 150° C. but only a layer within .001″ of the surface reaches this temperature or more.

As shown in the drawing, there is provided a winding roller 11 driven at constant speed from a speed-regulated electric motor 12, an unwinding roller 13, and a tensioning roller 14. Furthermore, there is provided a cooling roller 16, intermediate the winding roller 11 and the tensioning roller 14. A polyethylene sheet 17 is suspended between these rollers, and is transported thereby in direction 18 lengthwise, as the winding roller 11 unwinds the sheet 17 from the roller 13. Heating means such as a gas burner 19, is provided opposite that portion of the surface of the roller 16 that transports the sheet 17, to convey heat to one surface of the sheet 17. The opposite surface of the sheet 17 is in contact with the roller 16. A cooling liquid is transported from a tank 21 through a conduit 22 in direction 23 to the interior of the roller 16 for cooling the outer surface thereof to cool the portion of the sheet in contact therewith, and the cooling liquid is discharged from the roller in a conduit 24.

(2) A .001″ sheet is passed close to a heating element of at least 800° C. near enough to produce a surface sheen. The reverse side is cooled with water. The surface exposed to the heat reaches 150° C. (up to a thickness of about .0002″), while the reverse side is cooled to 20° C. with a water spray or a water cooled roller.

(3) A blown polyethylene bottle is passed through hot air of a temperature higher than 400° C. the amount of air being sufficient to produce a surface sheen and to heat the surface to about 150° C. and to heat a surface layer of not more than about .008" to 100° C. while the reverse side does not reach a temperature about 50–70° C. The inside of the bottle preferably is cooled by a stream of cold air.

(4) An extruded polyethylene article thicker than about .03" is being transported rapidly through a hot oven of enough heating capacity to heat the surface layer (up to .01" preferably not more than .001") to 100–150° C. but the bulk of the article to not more than 50° C. and then is cooled rapidly.

The surface is thus cooled, to harden, after the temporary heating operation.

All the surfaces will show on the heated sides a much better bond to printing inks than on the untreated surfaces or the reverse sides. This effect is most noticeable right after this treatment but will be effective for some time after it.

Any ink suitable for printing on polyethylene is suitable for this purpose. An example for such an ink is:

18% plasticized vinyl resin
10% titanium oxide
20% medium boiling hydrocarbons aromatic
52% low and medium boiling ketones To prepare both sides of a sheet for better printing it usually will be preferable, and in case of thin gauges necessary, to subject one side after the other to a heat treatment of this invention.

This procedure can advantageously be used in the manufacture of extruded sheets or blown articles. For example, in the production of sheets the one side of the sheet after leaving the calender could be heated by the above means or could be left just exposed to as little cooling air as possible, while the other side could be quenched, for example, by means of a water cooled roller.

While, due to the great importance of this problem, this invention is particularly described with respect to the improvement of polyethylene resins with respect to their bonding with printing inks, it is by no means restricted thereto. This invention is equally applicable, and for the same reasons, where the bonding properties of the surface are to be improved for any other material, such as especially adhesives of all kinds, such as vinyl adhesives, or adhesives made from vinyl homologues or derivatives, or vinyl copolymers, but also for rubber adhesives, both natural and synthetic, and so on. Generally this invention will be applicable in all cases where substances show bonding properties with polyethylene type resins and show the same phenomenon of inherent bonding thickness as illustrated with the polyethylene printing inks.

In other words, this invention refers to a method of improving the bonding properties of polyethylene resins which comprises subjecting the resin to a differential heat treatment whereby the surface whose bonding properties is to be improved is subjected to an elevated temperature sufficient to improve its bonding properties but not in excess of temperatures compatible with the stability of the polyethylene resin, the thickness of the surface layer thus treated not being in excess of the inherent bonding thickness thereof, while the material adjoining the said surface layer is held at temperatures below the minimum temperature effective for the said surface treatment.

The term polyethylene resins as used in the appended claims is to be understood to comprise all polyethylene type resins, that is the various resins obtained by the polymerization of ethylene or its homologues, or such copolymers or mixtures thereof whose surface characteristics are predominantly or at least noticeably determined by the ethylene structure thereof.

What I claim is:

1. The method of printing on a surface of a body of polyethylene resins which comprises subjecting the resin body to a differential heat treatment whereby the said surface is subjected to an elevated temperature sufficient to improve its bonding properties but not in excess of temperatures compatible with the stability of the polyethylene resin, while the material adjoining the said surface layer is held at temperatures below the minimum temperature effective for the said surface treatment and printing on said surface when in cool condition.

2. The method of printing on a surface of a body of polyethylene materials which comprises subjecting the surface of the resin body to be printed to a differential heat treatment whereby the printing surface is subjected to an elevated temperature sufficient to improve its bonding properties but not in excess of temperatures compatible with the stability of the polyethylene resin, while the material adjoining the said surface layer is held at temperatures below the minimum temperature effective for the said surface treatment, and applying printing matter to the surface after cooling thereof.

3. The method of printing on a surface of a body of polyethylene materials which comprises subjecting the surface of the resin body to be printed to a differential heat treatment whereby the printing surface is subjected to an elevated temperature sufficient to improve its bonding properties but not in excess of temperatures compatible with the stability of the polyethylene resin, while material adjoining the said surface layer is held at temperatures below the minimum temperature effective for the said surface treatment, and printing the said resin subsequent to the said heat treatment but before the surface has reverted to its original inactive state.

4. The method of printing on a surface of a body of polyethylene resins which comprises subjecting the surface layer to be improved to a temperature above about 60° C., while material adjoining the said surface layer is being held below about 50° C., and applying ink to said surface when the latter is in a cool state.

5. The method of printing on a surface of a body of polyethylene resins which comprises subjecting the surface layer of said body to be improved to a temperature above about 60° C., while underlying parts of the material are being held below about 50° C., and printing the said resin subsequent to the said heat treatment but before the surface has reverted to its original inactive state.

6. The method of printing on a surface of a body of polyethylene resins which comprises subjecting the resin body to a differential heat treatment whereby the surface whose bonding properties is to be improved is subjected to an elevated temperature sufficient to improve its bonding properties but not in excess of temperatures compatible with the stability of the polyethylene resin, while the remainder of the body is held at temperatures below the minimum temperature effective for the said surface treatment, at least partially by cooling, and printing on said surface in cool condition thereof.

7. The method of printing on a surface of a body of polyethylene-materials which comprises subjecting the surface of the body to be printed to a differential heat treatment whereby the printing surface is subjected to an elevated temperature sufficient to improve its bonding properties but not in excess of temperatures compatible with the stability of the polyethylene resin, while the remaining thickness of the material is quenched rapidly below the minimum temperature effective for the said surface treatment and printing on said surface in cool condition thereof.

8. The method of securing decorative matter to a surface of a polyethylene body which comprises first softening said surface by the application of heat thereto without materially heating the rest of said body, then permitting said surface to harden, and thereafter applying the decorative matter thereto.

9. The method of securing decorative matter to a surface of a polyethylene body which comprises subjecting said surface to the direct action of an open flame to an extent sufficient to melt said surface, then permitting said surface to harden, and thereafter applying the decorative matter thereto.

10. The method as claimed in claim 8, further characterized in that, said heating of said surface being carried out to a temperature in excess of about 60° C. while the said rest of said body being held to a temperature below about 50° C.

11. In a method of printing on a surface of a polyethylene body, the steps comprising, heating said surface to a temperature sufficiently elevated to soften said surface while maintaining the rest of said body at a lower temperature, and finally printing onto said surface after hardening thereof.

12. In a method as claimed in claim 11, further characterized in, said rest of said body being cooled for restraining heating thereof to rise above said lower temperature.

13. In a method as claimed in claim 11, said elevated temperature being above about 60° C., and said lower temperature about 50° C.

WERNER H. KREIDL.

REFERENCES CITED

The following references are of record in the file of this patent:

UNITED STATES PATENTS

| Number | Name | Date |
|---|---|---|
| 2,463,370 | Flaster | Mar. 1, 1949 |

FOREIGN PATENTS

| Number | Country | Date |
|---|---|---|
| 560,184 | Great Britain | Mar. 23, 1944 |